Feb. 6, 1962 R. J. GITS 3,020,052
SHAFT SEAL
Filed Nov. 1, 1955
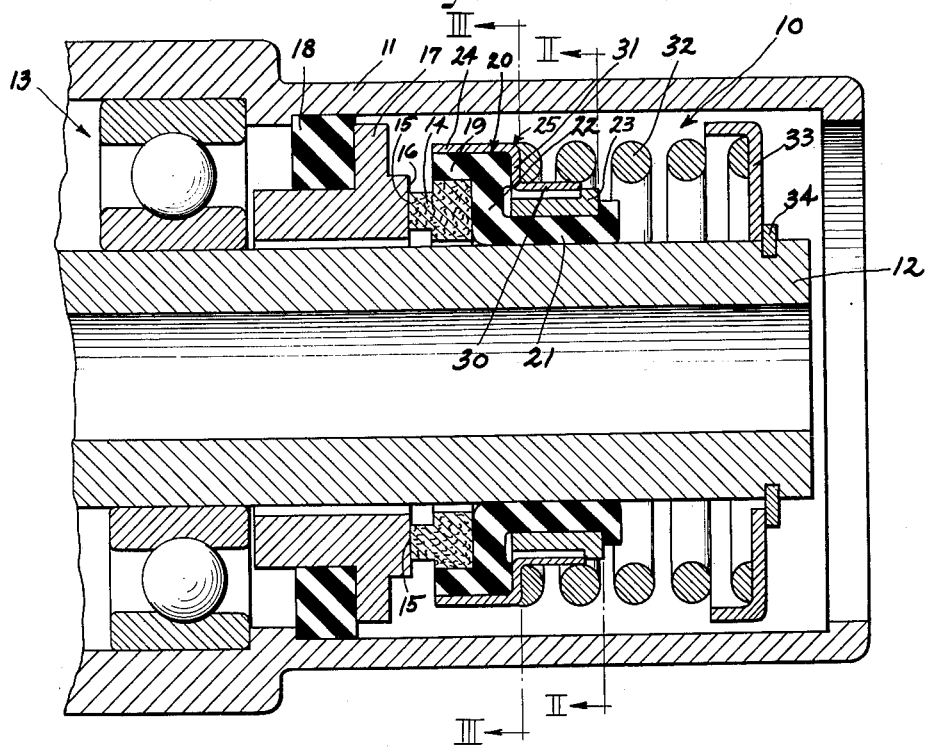
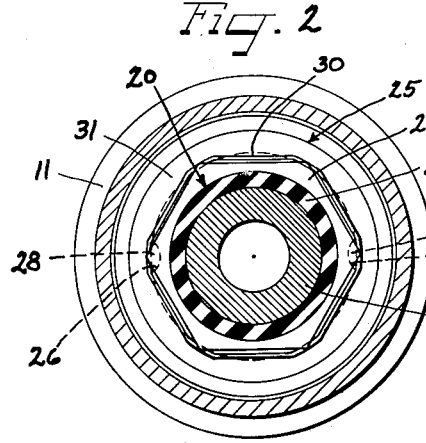
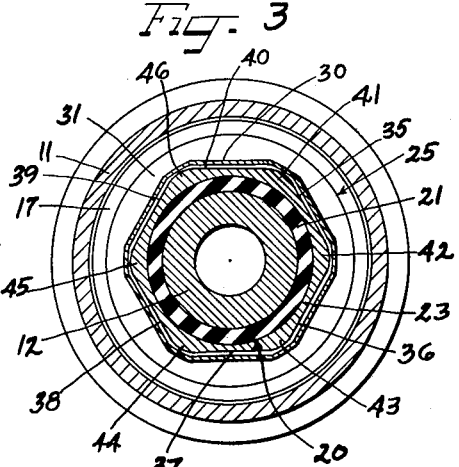
Inventor
Remi J. Gits

3,020,052
SHAFT SEAL
Remi J. Gits, Hinsdale, Ill., assignor to Gits Bros. Mfg.
Co., Chicago, Ill., a corporation of Illinois
Filed Nov. 1, 1955, Ser. No. 544,159
2 Claims. (Cl. 277—89)

This invention relates to a shaft seal or the like in which a seal is effected between a pair of relatively rotatable elements, such as between a shaft and a wall through which the shaft extends.

In such a seal, a seal ring is carried by one element and has a sealing face in a plane transverse to the axis of relative rotation engaging a like face of the other element, resilient means being provided for urging the sealing faces into pressure engagement. To provide for relative axial movement of the elements and to compensate for wear of the sealing faces, it is necessary to permit relative axial movement between the seal ring and the element carrying the same and it is also necessary to maintain a seal between the ring and the element carrying the same. It is further necessary to provide a connection which will limit rotation of the ring relative to the ring-carrying element while permitting the necessary relative axial movement.

To provide for relative axial movement while limiting relative rotation, it has heretofore been the practice to provide a key-keyway connection or the like between the seal ring and the element carrying the same. Such a connection has not been entirely satisfactory because with the torque transmitted through the connection, the key wears a notch in the keyway to oppose relative axial movement of the ring and the ring-carrying element.

A further problem in connection with such seals is in the support of the seal ring which is desirably of a lubricating material such as carbon or the like, which materials are generally very brittle. The seal ring supports heretofore provided have not been entirely satisfactory in that they tend to break the seal ring and/or do not securely support the same.

Shaft seals heretofore provided have also been more complicated and expensive to manufacture and assemble than would be desirable.

An object of this invention, accordingly, is to provide a shaft seal or the like incorporating improved means for limiting relative rotation between a seal ring and an element carrying the same while permitting relative axial movement.

Another object of this invention is to provide an improved shaft seal or the like in which the seal ring is securely supported without being susceptible to breakage.

A further object of this invention is to provide an improved shaft seal which is simple and inexpensive to manufacture and assemble.

According to this invention, a first member is provided defining a seal ring having a sealing face arranged to coact with a sealing face on one of a pair of rotatable elements and a second member is adapted to be carried by the other of the relatively rotatable elements, with means being carried by one of such members and formed to define a rounded axially extending ridge of uniform cross-section, and with means carried on the other of such members defining converging surfaces forming an axially extending recess receiving the rounded ridge to limit relative rotation of the members while permitting relative axial movement thereof. With this arrangement, there is substantially no tendency to wear notches such that would prevent relative axial movement, as is the case with the key-keyway connections heretofore used.

Preferably, a plurality of axially extending ridges are provided with a similar plurality of recesses, and most preferably, means are provided defining an outer surface including a plurality of flat side portions in regular polygonal relationship with the junctions between such flat side portions being rounded to define the plurality of circumferentially spaced axially extending ridges with means being provided defining an inner surface of regular polygonal shape to define recesses for cooperation with the ridges formed by the rounded junctions of the flat sides. This polygonal form is particularly advantageous because the members can be readily formed and with the plurality of cooperating ridges and recesses, more reliable operation is insured.

According to a further feature of the invention, an annular support element of flexible resilient material such as rubber is provided having first and second sleeve portions with an intermediate diaphragm portion interconnecting the sleeve portions, and one of such sleeve portions is disposed between a cylindrical outer surface of the seal ring and a cylindrical inner surface of a rigid band. Such sleeve portion has a substantially uniform thickness so as to exert uniform compressive forces on the seal ring. With the seal ring being formed of carbon or a similar material this is highly advantageous because such materials are brittle and have little resistance to shearing and tensioning forces as compared to their resistance to compressive forces. Accordingly, the ring may be very securely held while obviating any tendency to exert shearing and tensioning forces which might break the same.

According to another feature of the invention, one of the sleeve portions of the annular support element of flexible resilient material is pressed into engagement with a cylindrical surface of an element of the seal by a rigid band with the other sleeve portion of the support element being arranged to carry the seal ring, and interengaging means are carried by the rigid band and the seal ring for preventing relative rotation thereof while permitting relative axial movement thereof. Thus the band serves the dual function of securing one of the sleeve portions to an element of the seal and providing the torque connection to the seal ring.

A further feature of the invention is in the provision of a second rigid band having one portion for pressing one sleeve portion of the flexible resilient element into engagement with the seal ring and a second portion in radial alignment with the first band, interengaging means being provided between the radially aligned portions of the bands to limit relative rotation of the elements while permitting relative axial movement thereof. With this arrangement, the second rigid band serves the dual function of holding the sleeve portion in engagement with the seal ring and providing the torque connection.

It will be noted that the above-described arrangements have the further advantage that the shaft seal is simple and inexpensive to manufacture and assemble, while being efficient and reliable in operation.

This invention contemplates other objects, features and advantages which will become more fully apparent from the following detailed description taken in conjunction with the accompanying drawings which illustrate a preferred embodiment and in which:

FIGURE 1 is an elevational sectional view through a shaft seal constructed according to the principles of this invention; and FIGURES 2 and 3 are sectional views taken substantially along lines II—II and III—III of FIGURE 1.

Reference numeral 10 generally designates a shaft seal constructed according to the principles of this invention, which is arranged to effect a seal between a pair of relatively rotatable elements such as a housing 11 and a shaft 12 journaled in the housing by a ball bearing assembly 13.

The seal 10 comprises a seal ring 14 carried by the shaft 12 and having a sealing face 15 in a plane transverse to the shaft axis engaged with a like face 16 of an annular member 17 supported within the housing 11 through a resilient annular sealing member 18.

The sealing ring 14 is preferably of a lubricating material such as carbon or the like and is disposed within a first sleeve portion 19 of an annular support element 20 of a resilient flexible material such as rubber, the element 20 having a second sleeve portion 21 engaged with the shaft 12 and an intermediate diaphragm portion 22 interconnecting the portions 19 and 21. The diaphragm portion 22 may flex to allow axial movement of the sealing ring 14 relative to the shaft 12.

The sleeve portion 21 is held in engagement with the shaft 12 by a rigid band 23 and the sleeve portion 19 is held in engagement with the outer surface of the sealing ring 14 by a portion 24 of a second rigid band 25.

To prevent rotation of the sealing ring 14 relative to the support element 20 and band 25, the sealing ring 14 has a pair of diametrically opposed recesses 26 and 27 in its outer surface which receive projections 28 and 29 of the sleeve portion 19 of the element 20. The outer surface of the sealing ring 14 is otherwise cylindrical, the inner surface of the portion 24 of the band 25 is cylindrical, and the sleeve portion 19 of the element 20 is, except for the projections 28, 29, of uniform thickness with the result that uniform compressive forces are exerted on the support ring 14 and since the ring 14 has a high strength with respect to compressive forces, it is securely held in position with no shearing or tensioning forces being exerted thereon to cause breakage. It will also be noted that the ring 14 can be readily assembled within the element 20 and band 25.

The band 25 has a portion 30 disposed in radial alignment with the band 23 and as will be described more in detail hereinafter, an interconnection is provided between the portion 30 and the band 23 to limit relative rotation of the same while permitting relative axial movement.

Intermediate the portions 24 and 30, the band 25 has a radially extending annular wall portion 31 which is engaged by a coiled compression spring 32, the other end of the spring 32 being engaged with an annular plate 33 held against movement relative to the shaft 12 by a retaining ring 34.

The outer surface of the band 23 is generally hexagonally shaped to provide a plurality of flat side portions 35-40 in regular polygonal relationship, and the junctions between the flat side portions 35-40 are rounded to define a plurality of circumferentially spaced axially extending ridges 41-46 of uniform cross-section. The portion 30 of the band 25 is also generally hexagonally shaped to provide a plurality of pairs of converging surfaces defining recesses for receiving the ridges 41-46.

With this arrangement, torque applied between the bands 23 and 25 will not wear any notches in either member such as might prevent relative axial movement therebetween, because of the rounded form of the ridges 41-46. Because of the fact that a plurality of ridges are provided, there is a uniform and reliable drive connection between the members, and it will be apparent that the members are readily formed and assembled.

It will be further noted that the band 25 not only serves to press the portion 19 of the element 20 into engagement with the sealing ring 14 but also functions to provide a drive connection between the sealing ring 14 and the shaft 12 and, in addition, serves as a means for receiving the load of the spring 32.

It will be understood that modifications and variations may be effected without departing from the spirit and scope of the novel concepts of this invention.

I claim as my invention:

1. In a shaft seal or the like for effecting a seal between a pair of relatively rotatable elements, an annular support element of flexible resilient material having first and second sleeve portions and an intermediate diaphragm portion interconnecting said sleeve portions, means for securing said second sleeve portion to one of the relatively rotatable elements, a seal ring of brittle lubricating material having a cylindrical outer surface and a sealing face arranged to coact with a sealing face on the other of the relatively rotatable element to form a seal, and a rigid band having a cylindrical inner surface for pressing said first sleeve portion into engagement with said cylindrical outer surface of said seal ring, said first sleeve portion being compressed between said cylindrical inner and outer surfaces to an extent sufficient to frictionally hold said seal ring against axial movement, and said first sleeve portion and said seal ring having axially extending interlocked projection and recess means to prevent relative rotation thereof.

2. A device for forming a seal with a stationary surface that is disposed radially of a shaft, comprising: a sealing ring having a polished end surface for engaging the stationary surface, a cylindrical outer surface and a radially disposed rear surface; an elastomer diaphragm engaging the outer cylindrical and the radial rear surfaces of the sealing ring and forming a seal therewith; a projection around the outer edge of said diaphragm extending rearwardly from the radial portion thereof; a cylindrical extension of said diaphragm extending rearwardly from the inner edge of the diaphragm and sealing ring, and containing a central opening through which a shaft may be extended; a metal band of cylindrical configuration surrounding said extension of said diaphragm; and a metal shell surrounding said diaphragm and metal band and having a radial portion spaced from the radial portion of the diaphragm by said projection, said shell having a driving connection with the metal band.

References Cited in the file of this patent

UNITED STATES PATENTS

| | | |
|---|---|---|
| 2,395,095 | Brady | Feb. 19, 1946 |
| 2,461,907 | Magnesen | Feb. 15, 1949 |
| 2,728,591 | Solari | Dec. 27, 1955 |
| 2,736,624 | Schoenrock | Feb. 28, 1956 |

FOREIGN PATENTS

| | | |
|---|---|---|
| 928,172 | France | May 26, 1947 |